July 14, 1936.  F. C. CHADBORN  2,047,615

BALANCED VALVE

Filed Jan. 15, 1932

INVENTOR.
Frederic C. Chadborn
BY
his ATTORNEY

Patented July 14, 1936

2,047,615

UNITED STATES PATENT OFFICE 2,047,615

BALANCED VALVE

Frederic C. Chadborn, Newburgh, N. Y.

Application January 15, 1932, Serial No. 586,789

13 Claims. (Cl. 121—46.5)

This invention relates to fluid controlling valves and is herein illustrated as embodied in a valve especially adapted to be operated by a weak source of power for controlling the flow of air, although the same valve is also useful for controlling liquids. The form of the valve herein illustrated is especially designed to enable distant devices to be operated by air or other fluid pressure coming through the valve, the valve being so easily operated that it offers no appreciable resistance to the highly sensitive power of an ordinary thermostat. This application is a continuation in part of my abandoned application Serial No. 317,660.

In the form herein illustrated the rotating member of the valve consists of a plug adapted to be rotated in a seat so that certain delivery passages or certain discharge passages in the plug selectively register with passages in the seat or body of the valve, with the result that a pipe beyond the valve becomes either a delivery pipe or a discharge pipe, according to the rotated position of the plug. In the form illustrated the fluid enters the valve through a central bore in the plug and the bore leads to the delivery passages, thus making it possible to completely balance the fluid pressure around the sides of the plug by cutting the passages symmetrically on the periphery of the plug.

In the form illustrated, the plug is tapered and fluid enters the central bore at the small end of the plug, thus making it possible to pivot the plug at its large end outside the fluid. This keeps the whole thrust of the plug on an easily accessible bearing, and in the form illustrated, the thrust is taken by a floating pivot, with the result that side thrust on the plug is practically eliminated.

When the valve is built in this form it is found that the plug turns most easily if it is made of short grained metal such as brass, having approximately the composition: copper 80 oz., tin 4 oz., spelter 3 oz., lead 1½ oz.

Such brass receives and retains a high, almost glass-like polish, with the result that the plug turns easily in its seat. Valves have been built which were turned by blowing with the breath on a lever less than an inch long fastened to the plug, even though, withstanding a fluid pressure of five hundred pounds per square inch.

Other features and advantages will hereinafter appear.

Figure 1:
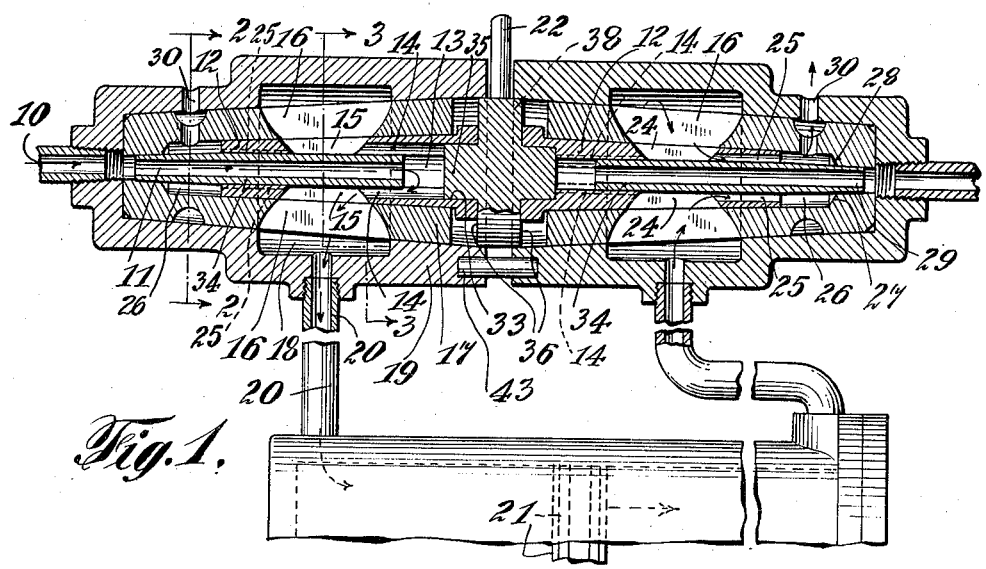
Figure 1 shows a double valve adapted to control a piston.
Figure 2:
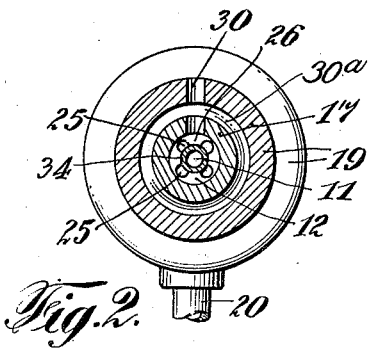
Figure 2 is a cross-section on the line 2—2 of Figure 1.
Figure 3:
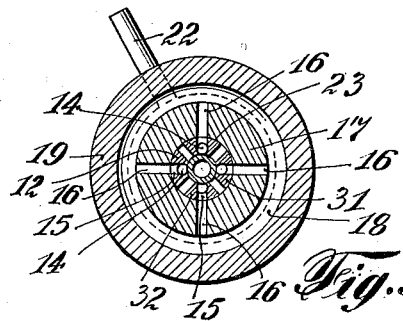
Figure 3 is a cross section on the line 3—3 of Figure 1.
Figure 4:
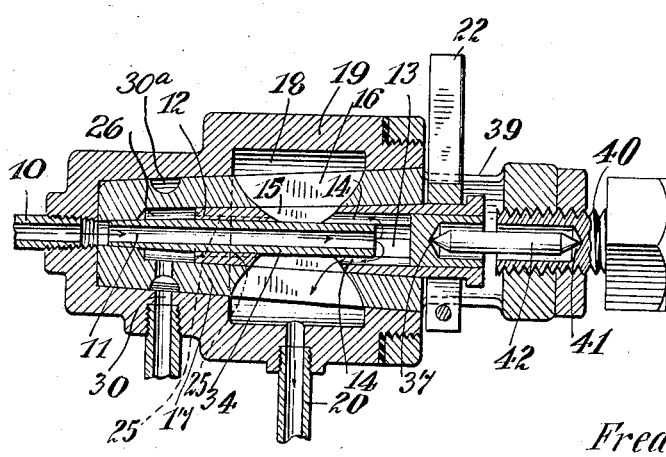
Figure 4 shows a valve having a preferred form of pivot.

In one position of the valve in the form shown fluid coming from a pipe 10 enters the central bore 11 of a plug 12, and passes through it to a chamber 13 at the far end of the plug. From the chamber 13 the fluid flows through small longitudinal delivery passages 14, which lie in the plug outside the bore 11, back toward the middle of the length of the plug passing there from the passages 14 into delivery longitudinal slots 15. From these slots 15 the fluid is shown as passing into corresponding slots 16 lying in the seat 17 of the valve and registering with the slots 15, and thence the fluid passes into an annular opening 18 in a hood or casing 19 in which the seat is mounted.

The annular opening 18 is shown as delivering the fluid to a pipe 20 through which the fluid passes to do whatever work it is intended to do, as, for example to move the piston 21.

If it is desired to allow the piston 21 to move back, the plug 12 may be rotated a fraction of a turn by its lever 22, until the slots 15 no longer register with the slots 16, but lie between them so that the wall 23 of the seat 17 blocks flow of fluid either from or to the pipe 10. On turning the plug 12 further its longitudinal exhaust slots 24 register with the slots 16, thus permitting fluid in the pipe 20 to flow back into the annular opening 18, and through these slots 24 to flow into small longitudinal exhaust passages 25 to an annular passage 26 formed by a shoulder 27 which lies on the outside of the plug. To close the other annular side of the opening 26, the seat 17 is provided with an internal annular flange 28 which forms a substantially fluid-light journal bearing on the projecting small end 29 of the plug 12.

The fluid is shown as escaping from the annular passage 26 by an annular passage 30a in the seat 17, which opens into an opening 30 open to the air. It will be seen that the delivery slots 15 alternate with the exhaust slots 24, and that between any two slots there is provided a solid surface 31 of the plug 12.

As a result the solid surfaces 31 may lap only some thousandths of an inch beyond any seat slot 16, thus enabling a minimum turning of the plug 12 by its lever, 22 to shift the valve from delivery to exhaust position.

The seat 17 is preferably of the same short grained brass as the plug, and sweated into the hood 19 with solder, so that the only metal facing the plug is the seat 17.

The plug 12 is easily manufactured by boring the exhaust passages 25 in a solid block 32 of the metal in which the longitudinal slots 15 and 24 have been cut, as by a miller, until the passages open into the proper slots, thus avoiding any need for boring with radial drills. Then the longitudinal delivery passages 14 are bored from the other end in the same way. Then a central bore 33 is drilled through the plug, partly cutting into the passages 14, and a tube 34 inserted into the bore 33 to make the small end 29 of the plug 12 and extend out beyond the annular passage 26. The tube 34 is held in place by soft solder, for many kinds of valves.

Then the plug 12 is mounted upon a close fitting stub 35 by solder so as to unite the plug body 32 to the end wall 36 and form the chamber 13. In manufacturing the plug, the enlarged end wall 36 when first thus made fast to the plug forms part of a temporary threaded base, so the plug, complete except for cutting off its base, may be set up in a lathe and turned down to the desired size.

After cutting off the temporary base, the base may have a bearing depression 37 cut in the center of its larger end, and be drilled transversely radially as at 38 to enable the lever 22 to be easily mounted.

The valve is made complete by threading a bracket 39 on to the hood 19, and threading a screw 40 terminating in a thrust bearing 41 into the bracket so that the bearing 41 supports a floating shaft 42 against the bearing depression 37 and holds the plug 12 in its seat 17.

The seat 17 will fit the plug 12 exactly because of the floating thrust bearing shaft 42. Thus a large bearing surface at practically no friction loss is provided for the valve and the exact close fit needed can be obtained by adjusting the thrust bearing screw 40. In practice it is found that a perceptible end movement of the plug, apparently less than a thousandth of an inch, is advantageous. It is found that a valve having a main body of the plug 12 which is one inch long and one-fourth inch average diameter and tapering 53/1000 of an inch in its length, makes a satisfactory valve to be operated by a thermostat and gives ample surface for eight longitudinal slots 15 and 24 around the periphery, thus effectively balancing the plug 12 in its seat 17.

The taper includes the seat flange 28 and the small end 29 of the tube 34. It is found that the tube 34 may be of ordinary brass without causing undue friction when the flange 28 bears in it.

Figure 5:
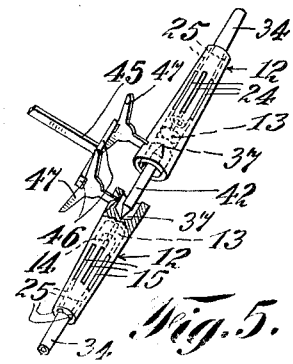
Figure 5 shows the coupled two valves, pivoted in the preferred form.

For use with thermostats, to minimize friction in working, each plug is preferably ground in its seat, first with the colloidal clay known as "mully", then with the finest precipitated chalk. If emery is wholly avoided it is found that the desired glass-like surface is thus obtained, giving an accurate fit, so that it is possible to avoid leakage and yet loosen the plug 12 a few thousandths of an inch in its seat 17 by turning the screw 40, with the result that the plug 12 seems to float in its pressure fluid.

Where two united valves, tapering in opposite directions are used, as in Fig. 1, the hoods 19 may be separated by a thrust pin 43. A finer adjustment of valve plugs in their seats can usually be obtained by building separate plugs 12, as shown in Fig. 5, with a single floating bearing pin 42 between them in sunken bearings 37. The plugs 12 may be turned simultaneously by a stem 45 which is fast to a second cross bar 46 adapted to engage in notches on forks 47 projecting from the plugs 12, and after turning by the notches to swing idly.

Having thus described certain embodiments of the invention, what is claimed is:

1. A balanced valve, including a casing, a plug therein, said casing having an annular space, said plug hving a circular series of alternate supply and waste ports therein, both series of ports being of equal area, the plug being adapted to be turned to either of two positions in the casing to operatively communicate either the supply or waste ports with said space whereby in both normal positions of the plug a like pressure will be had on opposite sides thereof, a sleeve interposed between the valve and the casing and having openings therein through which either the supply or waste ports communicate with the annular space, said plug having chambers adjacent its ends, one of said chambers constituting a waste chamber and having a waste outlet, said plug having longitudinal passages connecting the waste ports with the waste chamber, and longitudinal passages connecting the supply ports with the other of said chambers, and said valve having a central bore or supply passage communicating with the last mentioned chamber.

2. A valve including a casing having a conical valve seat, a conical valve plug rotatable upon said seat and having an end thrust bearing, an abutment carried by the casing, and means embodied in said plug subject to fluid pressure for normally urging said plug longitudinally and against said abutment, said means including the larger end of said plug.

3. A valve including a casing having a conical valve seat, a conical valve plug rotatable upon said seat and having an end thrust bearing, an abutment carried by the casing, and means embodied in said plug subject to fluid pressure for normally urging said plug longitudinally and against said abutment, said means including the larger end of said plug and being operable by the pressure of fluid passing through said valve.

4. A valve including a casing having a conical valve seat, a conical valve plug rotatable upon said seat and having an end thrust bearing, an abutment carried by the casing, and means embodied in said plug subject to fluid pressure for normally urging said plug longitudinally and against said abutment, said means including the larger end of said plug and being operable by the pressure of fluid passing through said valve, and including a return bent passageway in said plug.

5. A valve including a casing having a conical valve seat, a conical valve plug rotatable upon said seat, and having an end thrust bearing, an abutment carried by the casing, and means embodied in said plug subject to fluid pressure for normally urging said plug longitudinally and against said abutment, said means including the larger end of said plug and being operable by the pressure of fluid passing through said valve, and including a return bent passageway in said plug formed by a wall adjacent said bearing adapted to receive right-angularly directed pressure from fluid passing through said valve.

6. A valve for fluids including a member having a central bore for fluid and symmetrically arranged peripheral longitudinal passages for fluid, a seat having a slight taper so that the member may seat itself, a frame for the seat providing a pair of annular passages around the member, one adapted to communicate with said longitudinal passages and the other adapted to communicate with the other longitudinal passages, means for rotating the member to selectively bring certain of the peripheral passages into register with openings in the seat to permit fluid to pass through the peripheral passages and seat openings into one or another of the annular passages.

7. A valve for fluids including a member having a central bore for fluid and symmetrically arranged peripheral longitudinal passages for fluid, a seat having a slight taper in which the member fits, a frame for the seat providing an annular passage around the member, an extension of the tapering member closely fitting the seat adapted to be engaged by a handle whereby the member may be turned, to selectively bring certain of the peripheral passages into register with openings in the seat to permit fluid to pass through the peripheral passages and seat openings into the annular passages, a pivot in the frame forming an end thrust bearing to hold the member in the taper, and a floating thrust shaft between the pivot and the member.

8. A valve for fluids including a tapered member having a central bore for fluid and symmetrically arranged peripheral longitudinal passages extending in opposite directions away from peripheral medial openings, a frame forming an annular passage from said peripheral medial openings, a correspondingly tapered shell having peripheral medial openings adapted to register selectively with the tapered member openings, and these extending beyond the member to form an end passage connected with an exit, and into which certain of the longitudinal passages open, an end wall for the member forming a chamber beyond the bore so that fluid may pass along the bore through the chamber and then through the longitudinal passages if they register with the other peripheral medial openings in the shell so that the fluid passes through these medial openings, and a pipe for leading away fluid from the peripheral medial shell openings through the passage formed by the frame.

9. A device of the character described, including a casing, sleeves in the casing, and a pair of oppositely disposed alined balanced valves in the sleeves, said valves being operatively connected and adapted to be moved simultaneously, both of said valves having alternately arranged series of supply and waste ports of equal area, and said sleeves and casing being so constructed that when either the supply or waste ports are opened a like pressure will be had upon opposite sides of the valve.

10. A valve including a casing forming a conical valve seat, a conical valve plug within said casing, the larger end of said valve including an end thrust bearing assembly, said valve including a central fluid passageway having an internal termination adjacent the larger end of said valve, whereby fluid passing therethrough toward the larger end will bear against the end wall of said fluid passage within the valve to provide fluid pressure for urging said plug away from the valve seat and against said thrust assembly.

11. A valve including a casing forming a conical valve seat, a conical valve plug within said casing, the larger end of said valve including an end thrust bearing assembly, said valve including a central fluid passageway having an internal termination adjacent the larger end of said valve, whereby fluid passing therethrough toward the larger end will bear against the end wall of said fluid passage within the valve to provide fluid pressure for urging said plug away from the valve seat and against said thrust assembly, said plug further including longitudinal passageways parallel to said first-mentioned passageway for permitting the passage of fluid through said valve without the use of said first-mentioned passageway.

12. A valve including a casing forming a conical valve seat, a conical valve plug within said casing, the larger end of said valve including an end thrust bearing assembly, said valve including a central fluid passageway having an internal termination adjacent the larger end of said valve, whereby fluid passing therethrough toward the larger end will bear against the end wall of said fluid passage within the valve to provide fluid pressure for urging said plug away from the valve seat and against said thrust assembly, said plug further including longitudinal passageways parallel to said first-mentioned passageway for permitting the passage of fluid through said valve without the use of said first-mentioned passageway, said last-mentioned passageways extending through the smaller end of said plug to communicate with a chamber therebehind, whereby fluid pressure will be exerted against the smaller end of said plug to urge said plug toward said thrust assembly when said first-mentioned passageway is not in use.

13. A valve having a body provided with an internally tapered valve seat having relatively narrow longitudinal slots therein, a conduit communicating therewith, a rotatable member seated in the valve seat and having longitudinal slots therein and passages leading in opposite directions from alternate slots, a supply conduit delivering fluid to the small end of the rotatable member so that flowing fluid passes through a central passage in the member and turns back near the larger end into the passages leading to that end, a third conduit adapted to conduct away fluid coming through the passages leading to the other end, and connected to an annular passage into which said passages deliver, and an end thrust bearing adapted to be adjusted to keep the member floating in its seat so that the member may be variably turned to register its slots variably with the body slots.

FREDERIC C. CHADBORN.